(12) United States Patent
Chiang (10) Patent No.: US 7,181,238 B2
(45) Date of Patent: Feb. 20, 2007

(54) STRUCTURE FOR TURNING ON/OFF WIRELESS COMMUNICATIONS OF NOTEBOOK COMPUTER BY LATCH MEMBER

(75) Inventor: Chuen-Lin Chiang, Taipei (TW)

(73) Assignee: Inventec Corporation, Taipei (TW)

( * ) Notice: Subject to any disclaimer, the term of this patent is extended or adjusted under 35 U.S.C. 154(b) by 445 days.

(21) Appl. No.: 10/885,766

(22) Filed: Jul. 8, 2004

(65) Prior Publication Data

US 2006/0019703 A1 Jan. 26, 2006

(51) Int. Cl.
*H04M 1/00* (2006.01)
*G06F 1/16* (2006.01)
*H05K 7/16* (2006.01)

(52) U.S. Cl. .............. 455/556.1; 455/575.3; 455/572; 455/556.2; 361/683; 361/680; 361/726

(58) Field of Classification Search ............ 455/575.3, 455/556.1, 556.2, 572–574; 361/679–683, 361/726

See application file for complete search history.

(56) References Cited

U.S. PATENT DOCUMENTS

| | | | | |
|---|---|---|---|---|
| 6,044,473 A | * | 3/2000 | Kim | .......................... 713/320 |
| 6,068,307 A | * | 5/2000 | Murphy | ....................... 292/302 |
| 6,115,239 A | * | 9/2000 | Kim | ........................... 361/681 |
| 6,122,152 A | * | 9/2000 | Goto et al. | ..................... 361/1 |
| 6,243,819 B1 | * | 6/2001 | Jung | ........................... 713/320 |
| 6,366,440 B1 | * | 4/2002 | Kung | ......................... 361/147 |
| 6,659,516 B2 | * | 12/2003 | Wang et al. | ............. 292/251.5 |
| 6,704,194 B2 | * | 3/2004 | Koo | ........................... 361/683 |
| 6,707,665 B2 | * | 3/2004 | Hsu et al. | ................... 361/681 |
| 6,762,928 B2 | * | 7/2004 | Lo | .............................. 361/681 |

FOREIGN PATENT DOCUMENTS

JP 2000137549 A * 5/2000

* cited by examiner

*Primary Examiner*—Duc M. Nguyen
(74) *Attorney, Agent, or Firm*—Bacon & Thomas, PLLC (57) ABSTRACT

The present invention discloses a structure for turning on/off the wireless communications of a notebook computer by a latch member, which comprises a latch groove disposed at a free end of a screen display of the notebook computer and a latch member disposed on a main system of the notebook computer at a position corresponding to the latch groove, wherein the latch member comprises a push member protruded from the front end of the main system, a hook section extended from the top of the main system and a guide pole disposed at an end corresponding to the other end of the push member. Further, a resuming type switch is disposed at a position corresponding to an end of the guide pole, such that when the screen display is lifted up and opened to press the push member of the latch member, the guided pole of the latch member presses the switch and thus the switch is electrically connected to turn the wireless communication online.

2 Claims, 10 Drawing Sheets

STRUCTURE FOR TURNING ON/OFF WIRELESS COMMUNICATIONS OF NOTEBOOK COMPUTER BY LATCH MEMBER

BACKGROUND OF THE INVENTION

1. Field of the Invention

The present invention relates to a structure for turning on/off wireless communications of a notebook computer by a latch member, more particularly to a structure for turning on/off wireless communications of a notebook computer by a latch member so that the switch for turning the wireless communications online or offline is hidden in the notebook computer to prevent the switch from ruining the artistic look of the notebook computer and avoid the switch from being hit or damaged.

2. Description of the Related Art

In recent years, both electronic and communications industries are booming, and thus networking are used in different places such as families, schools and companies and greatly changes the mode of our communications and breaks through the limitation of time and space, which also gives us tremendous convenience. Since portable electronic products (such as notebook computers) have become more popular day after day, users would always like to use networks anywhere in addition to the demand for a high speed of the network. For sure, users do not like to find or connect a network cable for networking, and thus a wireless local network has come in place.

The wireless local area network (WLAN) connects an electronic product to an access point for a wireless network through a wireless network module (such as a wireless card, CF card, a PCI Express card or a PCMCIA card) and uses radio waves for the data transmission and the Internet connected to the access point for the connection with the Internet to access various network resources.

At present, a wideband networking is very popular worldwide, and many international airports, hotels and cafés provide similar services, and users only need to insert a wireless network card into their notebook computer and enter the account number and password provided by the network provider to use various network resources. The advantages of using the functions of the wireless local area network include:

1. The application is not limited to a fixed position where the network circuit is located.
2. It is not necessary to comply with the specifications of the network circuit and slot, which can save the time, labor cost and material cost for laying the cable circuit.
3. According to the IEEE802.11b protocol specified by the Institute of Electric and Electronic Engineers, the access point can provide a transmission speed up to 11 Mbps which is about 200 times as that of the general modems for a dial-up connection with the network (56 Kbps) and can meet user's requirements for the data transmission of a large volume of files.
4. The wireless local area network can add new users easily without being limited by the number of connectable points of a network.

Figure 1:
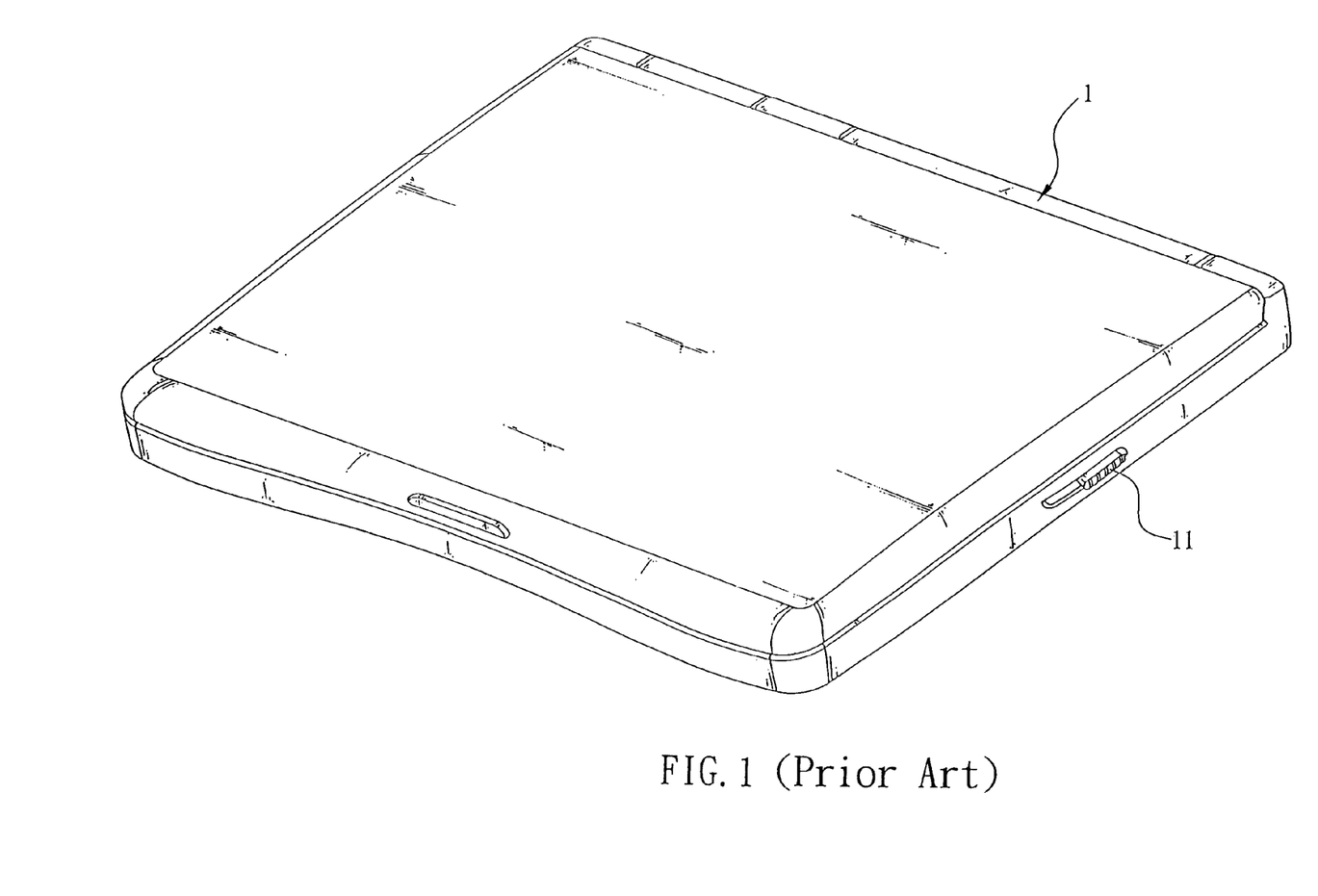
FIG. 1 is a perspective view of the notebook computer of a prior art.

However, the application of a wideband wireless network is limited by its location such as an airplane or a hospital, etc. Please refer to FIG. 1. To facilitate users to turn off the connection of a wireless wideband network of a notebook computer 1, some manufacturers build a switch for turning on/off a wireless network module on the surface of the notebook computer 1, so that users can turn the wireless wideband network offline anytime through the switch 11. However, since the switch 11 is designed on the surface of the notebook computer 1, it will affect the artistic look and be hit or damaged easily. When a user turns off the notebook computer 1, the wireless wideband network connection will be turned offline as well. Therefore, users may forget to turn the switch to an off position very easily before rebooting the computer. The wireless network module will be turned on as well to automatically search for the wireless transmission sources and unintentionally connecting the notebook computer 1 to a wireless wideband network, which will cause unnecessary problems or inconvenience.

SUMMARY OF THE INVENTION

In view of the shortcomings of the prior art, the inventor of the present invention based on years of experience on the manufacture and technology of the related electronic device to conduct researches and experiments to overcome the foregoing shortcomings and finally invented the structure for turning on/off the wireless communications of a notebook computer by a latch member in order to eliminate the deficiencies and drawbacks of the prior art.

Therefore it is the primary objective of the present invention to provide a structure for turning on/off the wireless communications of a notebook computer by a latch member, so that the switch for turning on/off the wireless communications of the notebook computer is hidden in the notebook computer in order to prevent the switch from ruining the artistic look of the notebook computer and avoid the switch from being hit or damaged.

Another objective of the present invention is to provide a structure for turning on/off the wireless communications of a notebook computer by a latch member, so that a user remembers to turn the wireless communications of the notebook computer offline after the notebook computer is turned off.

The technical measures taken by the present invention for achieving the foregoing objectives, the structure comprises a latch groove disposed at a free end of a screen display of the notebook computer and a latch member disposed on a main system of the notebook computer at a position corresponding to the latch groove, wherein the latch member comprises a push member protruded from the front end of the main system, a hook section extended from the top of the main system and a guide pole disposed at an end corresponding to the other end of the push member. Further, a resuming type switch for turning on/off the wireless communications is disposed at a position corresponding to an end of the guide pole, such that when the screen display of the notebook computer is lifted up and opened to press the push member of the latch member, the guided pole of the latch member presses the switch and thus the switch is electrically connected to turn the wireless communication online. Alternatively, the push member of the latch member is pressed again, so that the guide pole of the latch member is pressed again to electrically disconnect the switch and turn the wireless communication offline. Such arrangement hides the switch for turning on/off the wireless communications inside the notebook computer to prevent the switch from ruining the artistic look of the notebook computer and avoid the switch from being hit or damaged. In the meantime, when a user closes the screen display of the main system of the notebook computer, the user will remember to press the push member of the latch member and thus the switch will be in an electrically disconnected status when the users turn on the guide pole of the latch member presses such switch again.

DETAILED DESCRIPTION OF THE PREFERRED EMBODIMENTS

Figure 2:
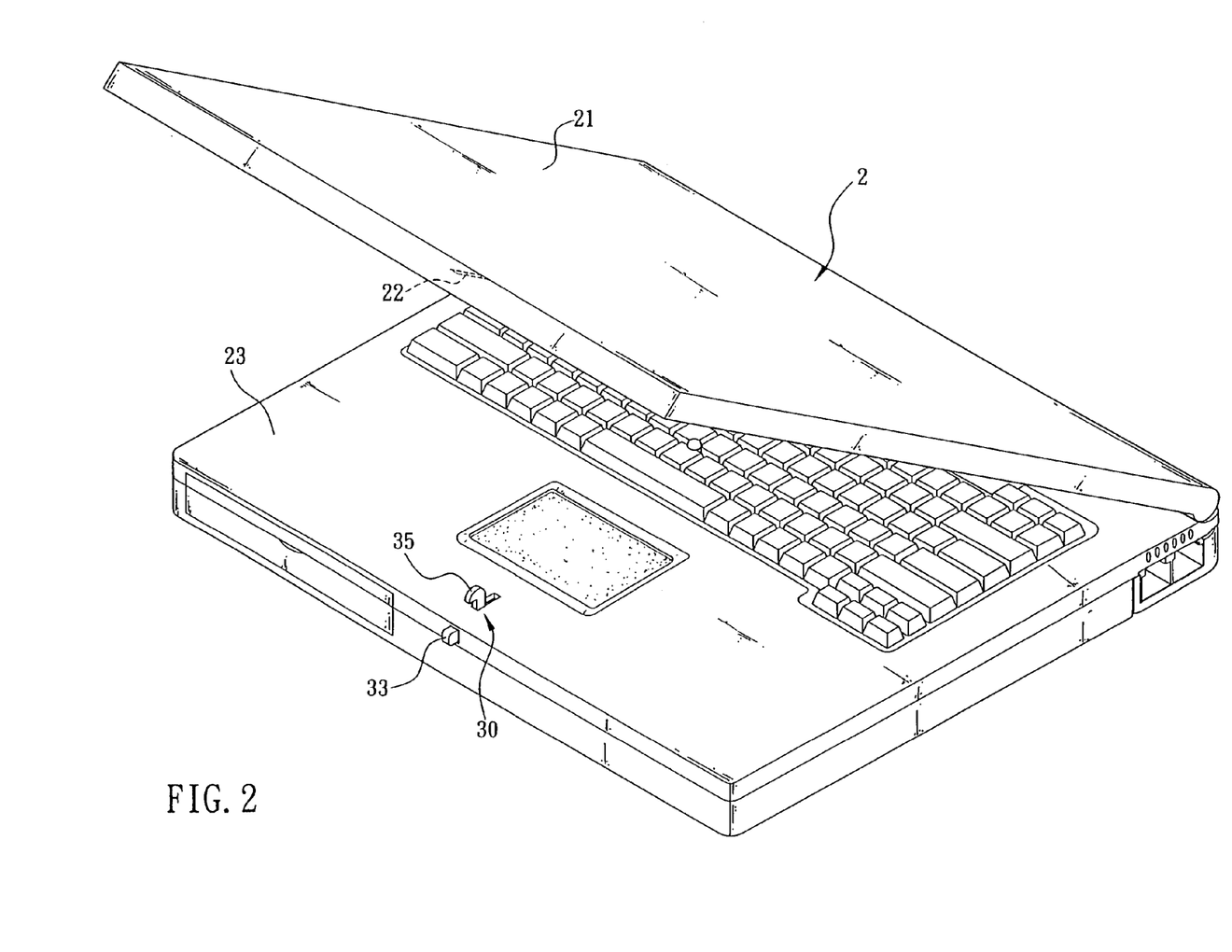
FIG. 2 is a perspective view of the notebook computer of the present invention.
Figure 3:
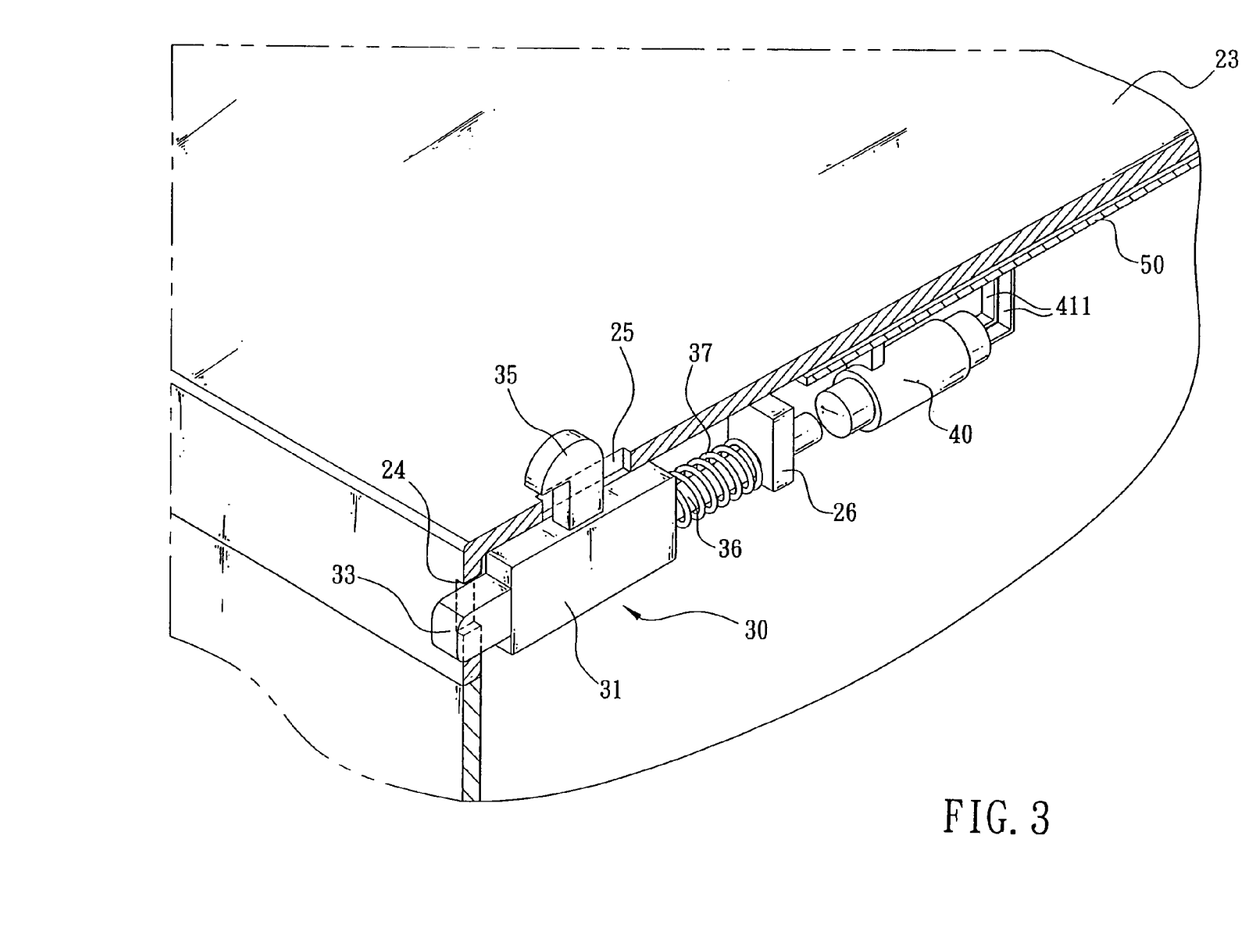
FIG. 3 is a perspective view of the latch member and the resuming type switch according to the present invention.

Please refer to FIGS. 2 and 3 for a structure for a notebook computer to turn on/off the wireless communications according to the present invention. The structure comprises a latch groove 22 disposed at a free end of a screen display 21 of the notebook computer 2 and a latch member 30 disposed on a main system 23 of the notebook computer 2 at a position corresponding to the latch groove 22.

Figure 4:
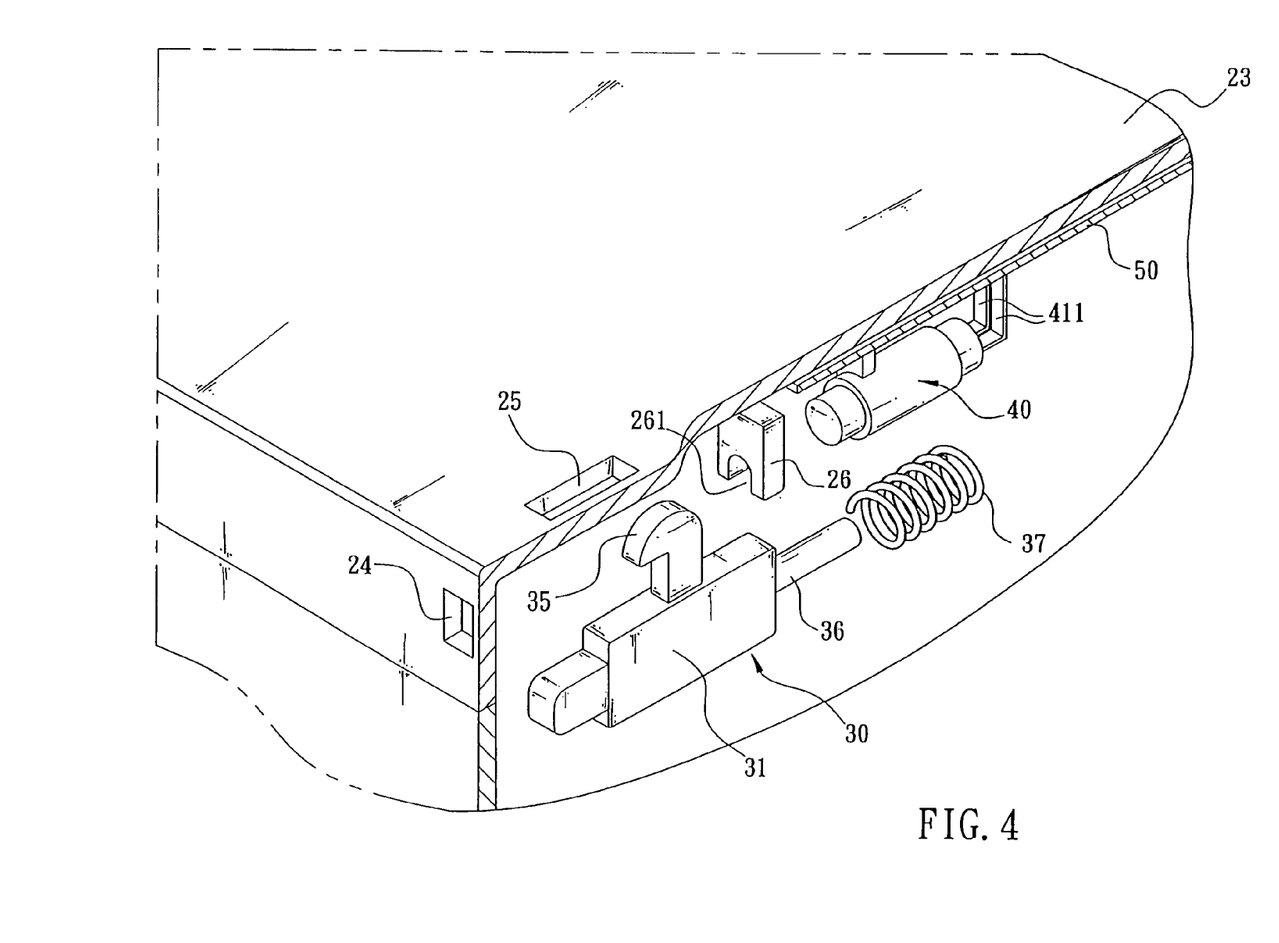
FIG. 4 is an exploded view of the latch member and the resuming type switch according to the present invention.

Please refer to FIGS. 3 and 4. The latch member 30 disposed in the housing of the main system 23 comprises a main body 31, and the main body 31 at one end facing the front end of the main system 23 comprises a push member 33 with a portion of the push member 33 protruded from an opening 24 at the front end of the main system 23, so that a user can press the push member 33 to produce a linear reciprocal movement to the latch member 33. The main body 31 at its top has a hook section 35, and the hook section 35 is extended from an opening 25 at the front end of the housing of the main system 23, such that the hook section 35 can be hooked into the latch groove 22 of the screen display 21.

Further, a guide pole 36 is disposed on an end corresponding to the other end of the push member 33 of the main system 23, and the other end of the guide pole 36 is installed into a channel 261 of a blocking panel 26 of the main system 23. A resilient member 37 such as a spring is sheathed onto the guide pole 36, so that one end of the resilient member 37 presses onto the main body 31 and the other end presses on the blocking panel 26, and thus when the latch member 30 produces a linear backward movement, the resilience of the resilient member 37 moves forward and resumes its original position. Further, refer to FIGS. 3 and 4 again. The main system 23 of the notebook computer 2 at a position corresponding to an end of the guide pole 36 comprises a resuming type switch 40 for turning on/off the wireless communications, and the resuming type switch 40 is electrically connected to a wireless communication circuit of the notebook computer 2.

Figure 5:
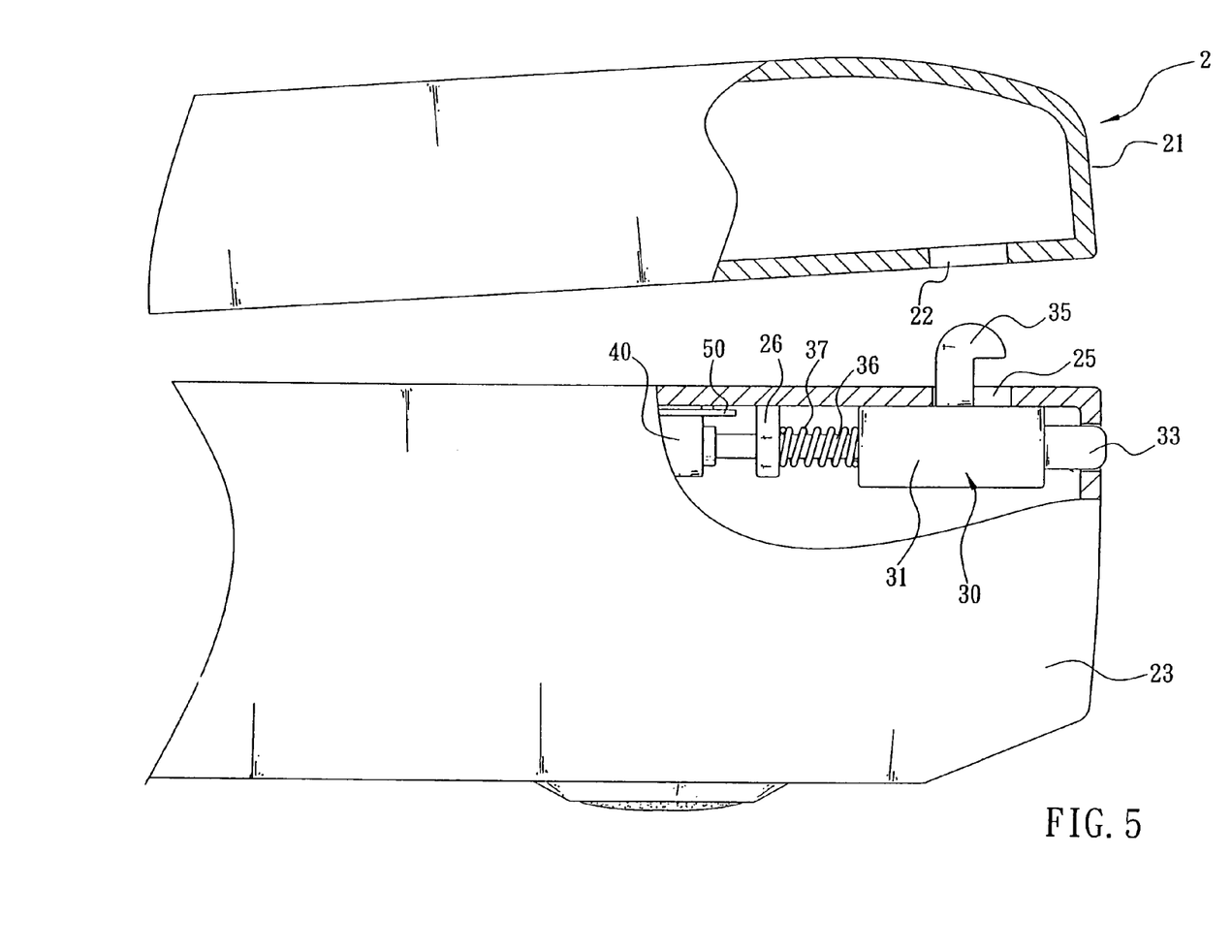
FIG. 5 is an illustrative view of the movement of the latch member according to the present invention.
Figure 6:
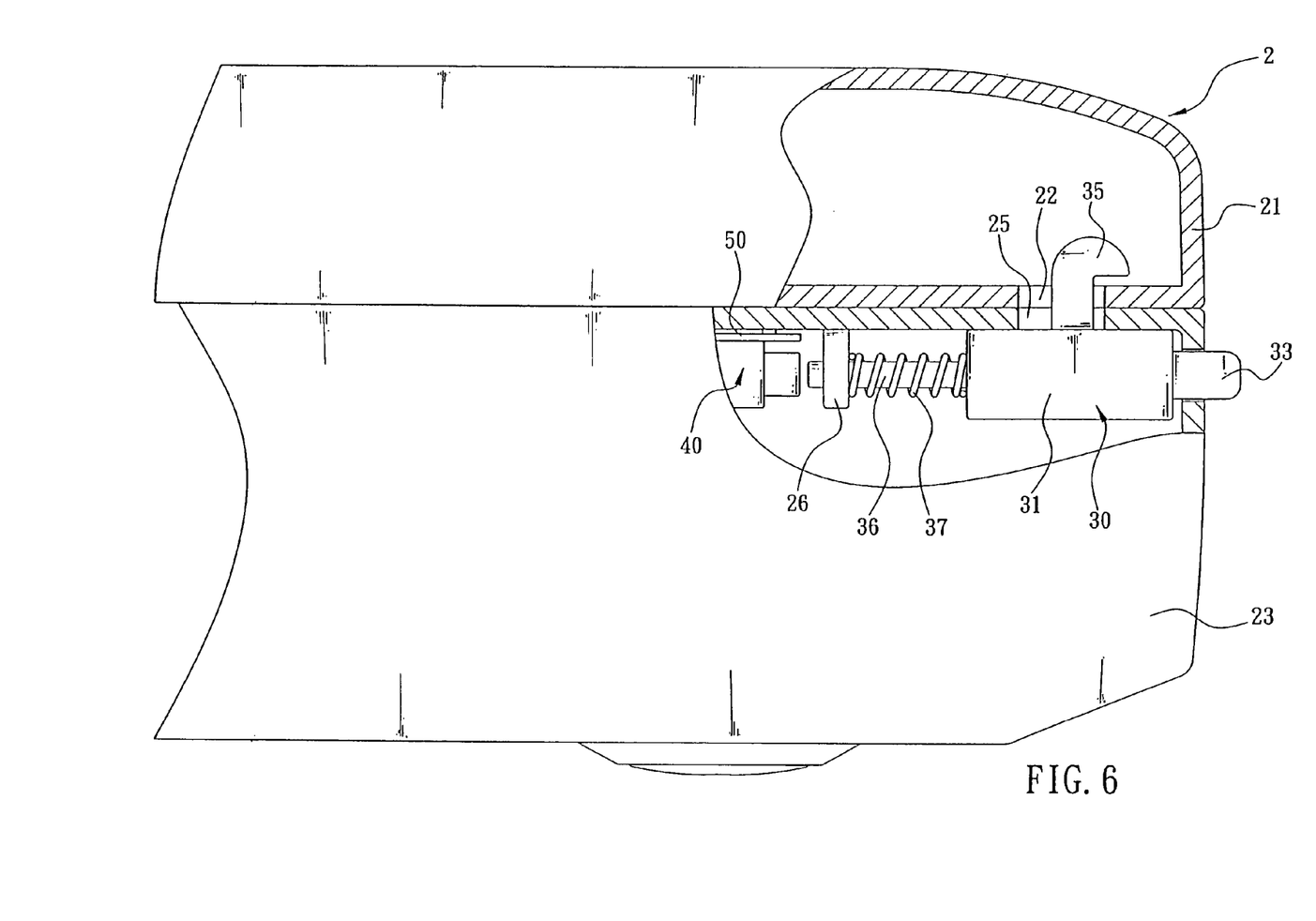
FIG. 6 is another illustrative view of the movement of the latch member according to the present invention.

Please refer to FIGS. 5 and 6. When a user closes the screen display 21 of the notebook computer 2 onto the main body 23 of the notebook computer 2, the user presses the push member 33 of the latch member 30, so that the hook section 35 of the latch member 30 latches into the latch groove 22 of the screen display 21. When a user lifts up the screen display 21 of the notebook computer 2, the user can press the push member 33 of the latch member 30, so that the hook section 35 of the latch member 30 detaches from the latch groove 22 of the screen display 21, and the screen display 21 is separated from the latch of the latch member 30 and can be lifted outward.

Please refer to FIGS. 3 and 4 again. The terminal 411 of the resuming type switch 40 is connected to a wireless communication circuit 50 of the notebook computer 2, so that when the resuming type switch 40 is pressed, the wireless communication of the notebook computer 2 is turned online or offline. Please refer to FIG. 7. The resuming type switch 40 has a hollow housing 41, and the housing 41 at its internal front end has a press member 42, and the front end of the press member 42 is protruded outside the housing 41, so that a user can press the press member 42 to electrically connect or disconnect the resuming type switch 40. The press member 42 at its rear end has a linking member 43. The linking member 43 at its rear end comprises a plurality of link gears 44 in a fixed shape, and the housing 41 at the inner edge corresponding to the positions of the link gears 44 comprises a plurality of positioning gears 45 to match with the link gears 44. Further, the position of some positioning gears 45 is higher than the position of some other positioning gears 45.

Figure 7:
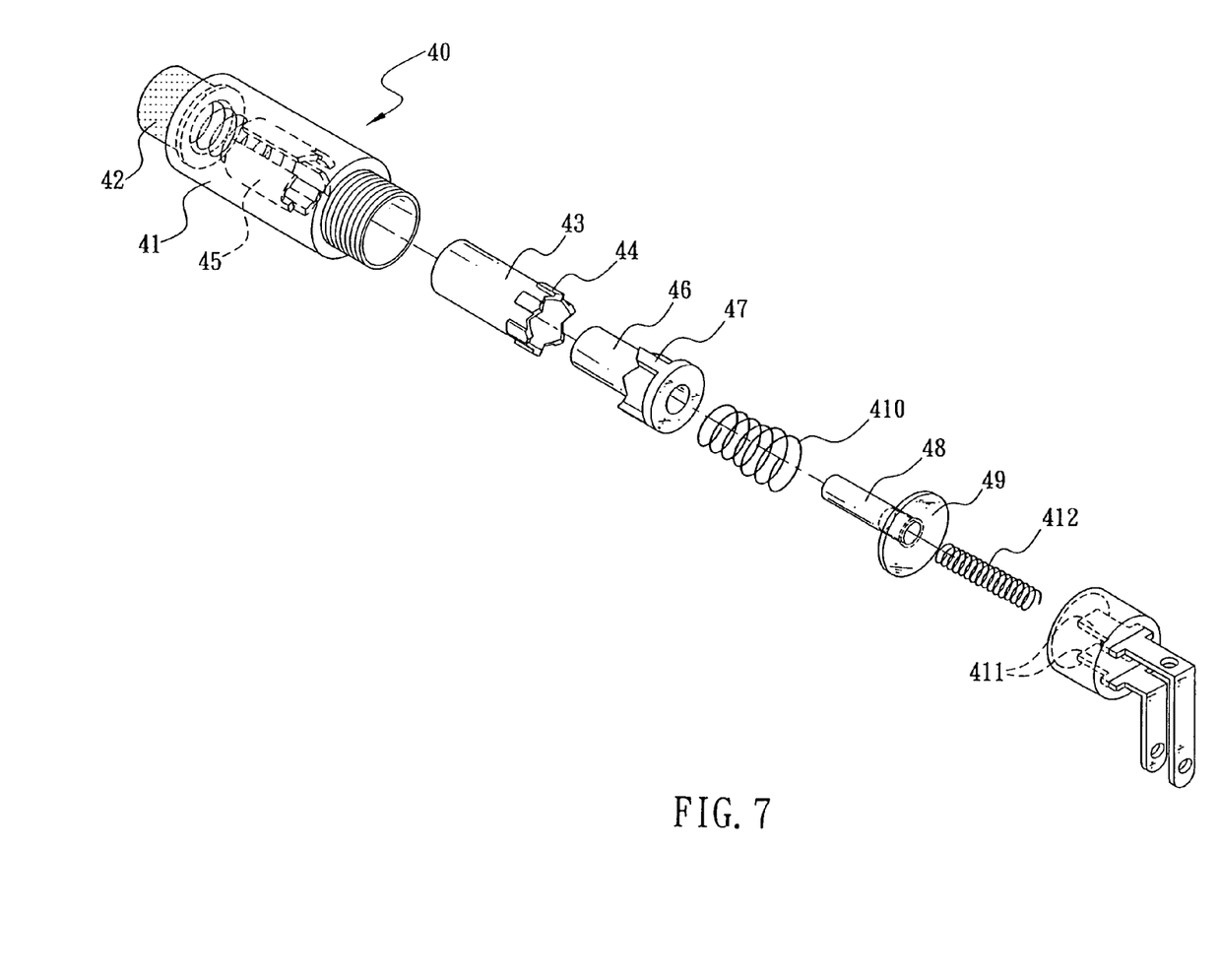
FIG. 7 is an exploded view of the resuming type switch according to the present invention.

The link gear 44 comprises a hollow movable nut 46 at one side, and the movable nut 46 comprises a plurality of axial latch serrations 47 disposed outwardly at one end, and the movable nut 46 is coupled to a hollow link rod 48. The link rod 48 comprises a guide plate 49 at one end and the link rod 48 comprises a spring 410, such that one end of the spring 410 presses against the latch serration 47 of the movable nut 49 and the other end of the spring 410 presses the guide plate 49. The guide plate 49 comprises a pair of terminals 411 disposed on one side (the same end of the housing 41), and one end of the terminal 411 is disposed in the housing 41 and the section of the other end of the terminal 411 protruded from the housing 41 is coupled to the wireless communication circuit 50 of the notebook computer 2. Further, the link rod 48 has another spring 412 disposed precisely between the link rod 48 and the terminals 411.

Please refer to FIG. 7 again. When a user presses the press member 42, the latch serrations 47 of the movable nut 46 are latched into the positioning gears 45 at a higher position or latched into the positioning gears 45 at a lower position and thus the latch serrations 47 are in contact with the terminals 411 at the same time or not in contact with the terminals 411 at the same time, such that the resuming type switch 40 is electrically connected or disconnected respectively.

Figure 8:
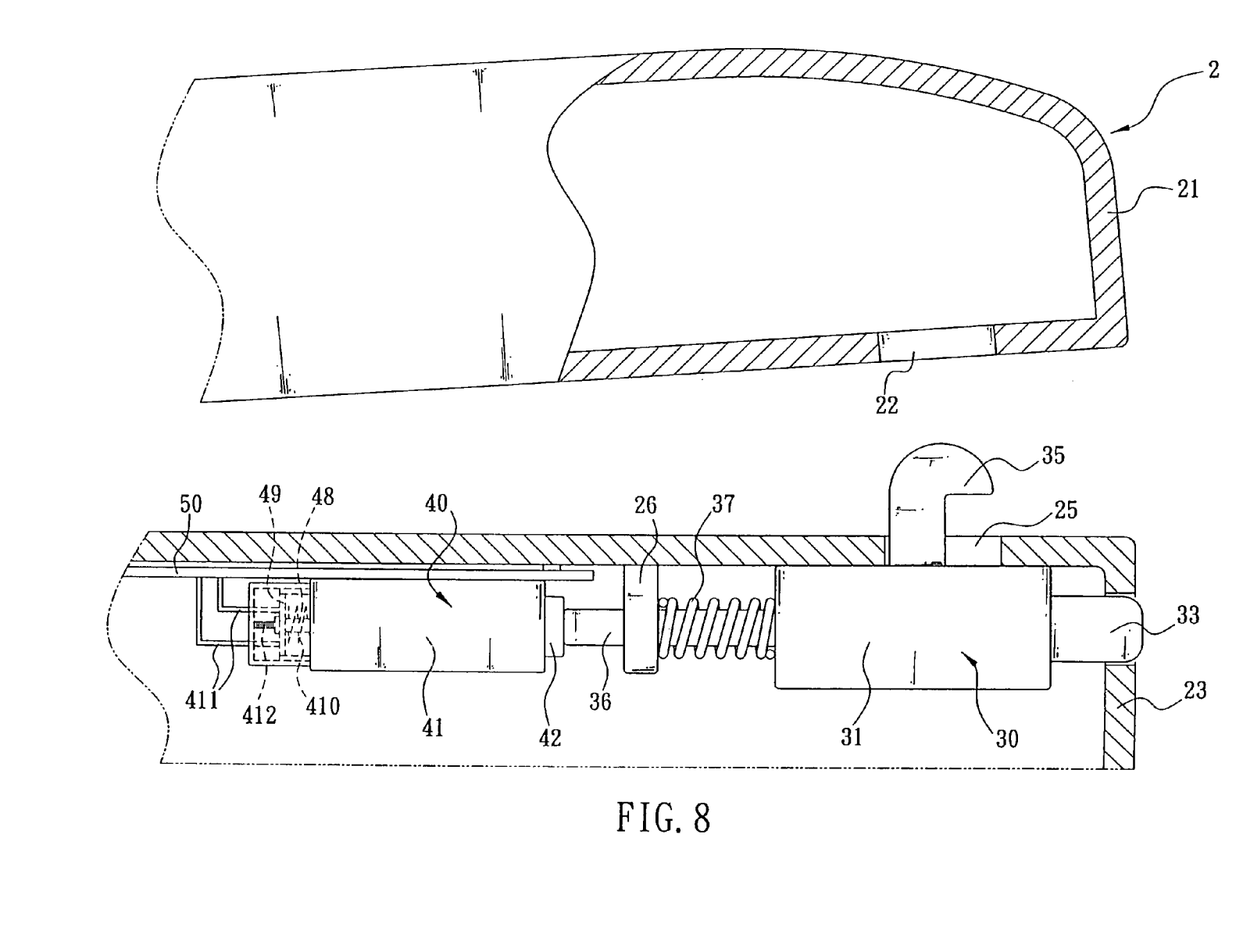
FIG. 8 is an illustrative view of the movement of the latch member and the resuming type switch according to the present invention.
Figure 9:
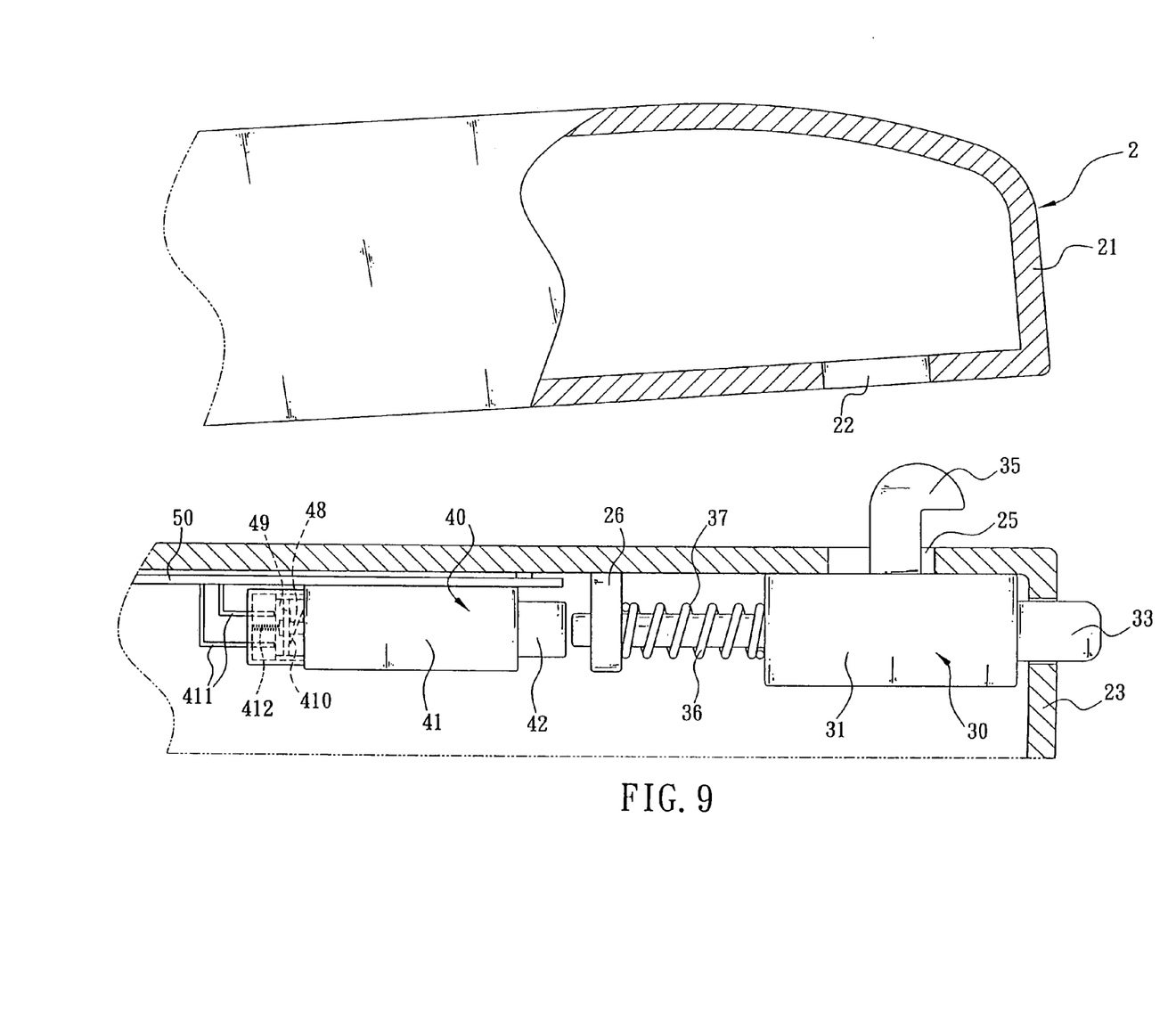
FIG. 9 is an illustrative view of the movement of the latch member and the resuming type switch according to the present invention.

Please refer to FIGS. 8 and 9. When the screen display 21 of the notebook computer 2 is lifted up and opened, the push member 33 of the latch member 30 is pressed, so that the guide pole 36 of the latch member 30 presses the resuming type switch 40 to electrically connect the resuming type switch 40 and thus turn the wireless communication online. When the push member 33 of the latch member 30 is pressed again, the guide pole 36 of the latch member 30 presses the resuming type switch 40 again to electrically disconnect the resuming type switch 40 and thus turn the wireless communication offline.

Figure 10:
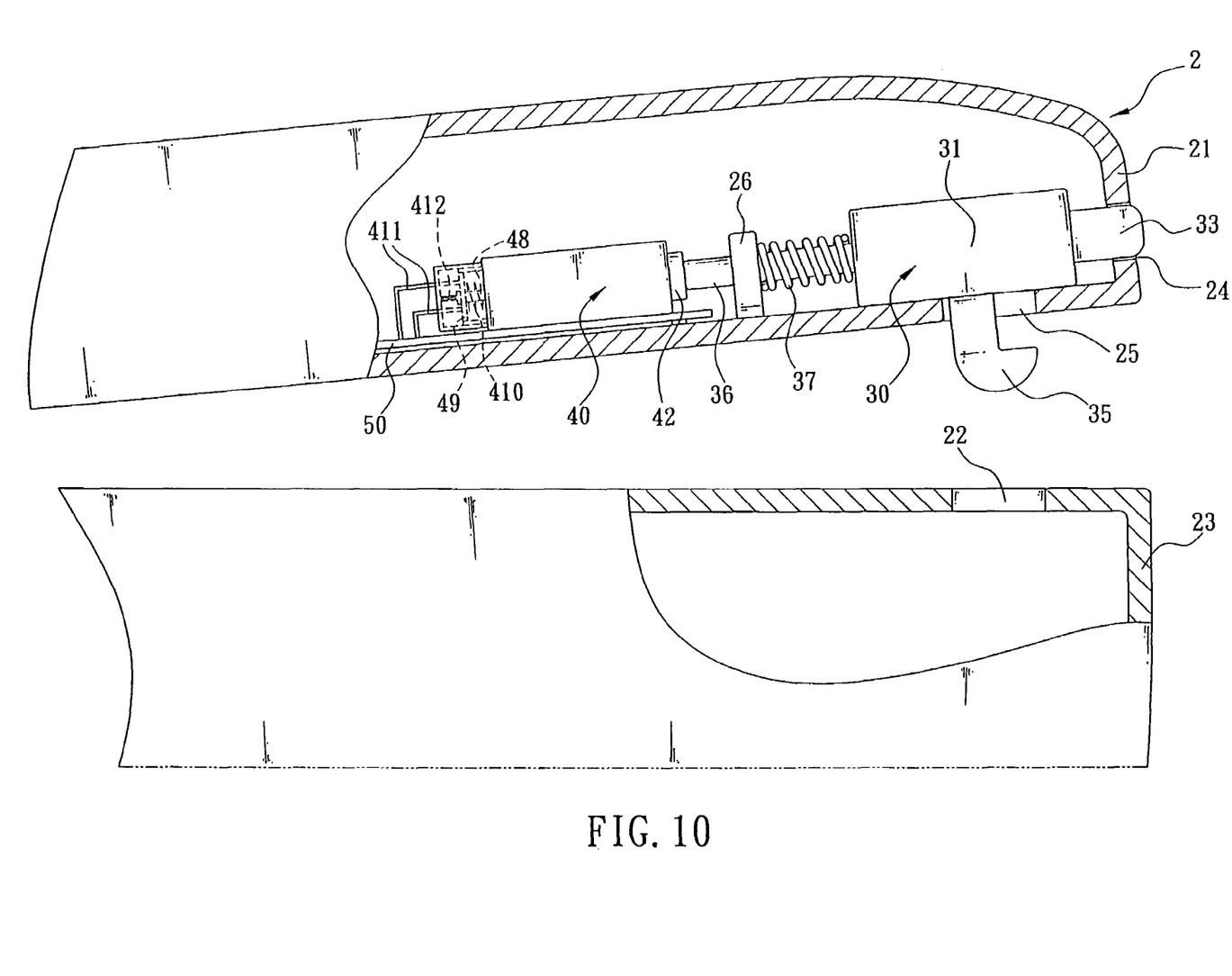
FIG. 10 is an exploded view of the latch member and the resuming type switch according to another preferred embodiment of the present invention.

Please refer to FIG. 10 for another preferred embodiment of the present invention. The latch member 30 and the resuming type switch 40 are disposed on a free end of the screen display 21 of the notebook computer 2, and a latch groove 22 is disposed on the main system 23 of the notebook computer 2 at a position corresponding to the latch member 30.

Please refer to FIG. 10 again. The latch member 30 is disposed in the housing of the screen display 21 and comprises a main body 31, a push member disposed at one end of the housing of the main body 31 facing the front end of the screen display 21. A portion of the push member 33 is protruded outside an opening 24 of the housing at the front end of the screen display 21, so that a user can press the push member 33 to drive the latch member 30 to produce a linear reciprocal movement. The main body 31 has a hook section 35 at the bottom and the hook section 35 is extended out from the opening 25 of the housing under the screen display 21, such that the hook section 35 can be hooked into the latch groove 22 of the main system 23.

Further, the main body 31 corresponding to another end of the push member 33 has a guide pole 36, and the other end of the guide pole 36 is installed in the channel of a blocking panel 26 of the screen display 21. A resilient member 37 is sheathed onto the guide pole 36, so that one end of the resilient member 37 presses against the main body 31 and the other end of the resilient member presses the blocking panel 26, and thus when the latch member 30 produces a linear movement backward, the resilience of the resilient member 37 drives the latch member 30 forward and resumes its original position. Further, a resuming type switch 49 for turning on/off the wireless communication is disposed in a screen display 21 of the notebook computer 2 at a position corresponding to an end of the guide pole 36, and the resuming type switch 40 is electrically connected with a wireless communication circuit 52 of the notebook computer 2.

Please refer to FIG. 10. When a user closes the screen display 21 of the notebook computer onto the main system 23 of the notebook computer 2, the users presses the push member 33 of the latch member 30 to hook the hook section 35 of the latch member 30 into the latch groove 22 of the main system 23. When a user lifts and opens the screen display 21 of the notebook computer 2, the user can press the push member 33 of the latch member 30 to detach the hook section 35 of the latch member 30 from the latch groove 22 of the main system 23 to lift up the screen display 21 outward.

Please refer to FIG. 10 again. When the screen display 21 of the notebook computer 2 is lifted up and opened, the push member 33 of the latch member is pressed such that the guide pole 36 of the latch member 30 presses the resuming type switch 40 to electrically connect the resuming type switch 40 and thus turn the wireless communication of the notebook computer 2 online. Alternatively, the push member 33 of the latch member 30 is pressed again, and the guide pole 36 of the latch member 30 presses the resuming type switch 40 again to disconnect the resuming type switch 40 and thus turn the wireless communication offline.

Please refer to FIGS. 2, 3 and 4 again. From the description above, the resuming type switch 40 for turning on/off the wireless communication of the notebook computer 2 according to the present invention is hidden inside the notebook computer 2 to prevent the resuming type switch 40 from ruining the artistic look of the notebook computer 2 and avoid the resuming type switch 40 from being hit or damaged. In the meantime, when a user closes the screen display 21 of the main system of the notebook computer 2 onto the main system 23 of the notebook computer 2, the user will remember to press the push member 33 of the latch member 30 and thus the guide pole 36 of the latch member 30 presses the resuming type switch 40 again to disconnect the resuming type switch 40 and turn the wireless communication of the notebook computer 2 offline. Such arrangement is very quick and convenient.

In summation of the description above, the present invention overcomes the shortcomings of the prior-art and enhances the performance than the conventional structure and further complies with the patent application requirements and is submitted to the Patent and Trademark Office for review and granting of the commensurate patent rights.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements.

What is claimed is:

1. A structure for turning on/off wireless communications of notebook computer, comprising:
    a latch groove, being disposed at a free end of a screen display of said notebook;
    a latch member, being disposed on a main system of said notebook computer at a position corresponding to said latch groove, and said latch member being disposed in a housing of said main system and having a main body, and said main body comprising a push member disposed on said main body facing the front end of said main system, and a portion of said push member being protruded out of an opening of said housing at the front end of said main system, thereby said press member being pressed to produce a linear reciprocal movement for said latch member and said main body at its top having a hook section, and said hook section being extended outside said opening of said housing at the upper section of said main system such that said hook section hooking a latch groove of said screen display, and said main body having a guide pole disposed on said main body corresponding to another end of said push member, and the other end of said guide pole being installed into a channel of a blocking panel of said main system;
    a resilient member, being sheathed onto said guide pole, such that an end of said resilient member pressing against said main body and the other end pressing against said blocking panel and said latch member producing a linear backward movement and the resilience of said resilient member driving said resilient member to resume its original position;
    a resuming type switch, disposed in said main system of said notebook computer at a position corresponding to an end of said guide pole for turning on/off a wireless communication, and said resuming type switch being electrically coupled to a wireless communication circuit of said notebook computer;
    thereby when said screen display of said notebook computer is lifted and opened, said push member of said latch member is pressed so that said guide pole of said latch member presses said resuming type switch to electrically connect said resuming type switch and turn on said wireless communication of said notebook computer; when said push member of said latch member is pressed again so that said guide pole of said latch member presses said resuming type switch again to electrically disconnect said resuming type switch and turn off said wireless communication.

2. The structure for turning on/off wireless communications of notebook computer of claim 1, wherein said resilient member is a spring.

* * * * *